US011851313B2

(12) United States Patent
Numata et al.

(10) Patent No.: US 11,851,313 B2
(45) Date of Patent: Dec. 26, 2023

(54) CAP ATTACHMENT-DETACHMENT DEVICE AND PRE-PROCESSING DEVICE

(71) Applicant: SHIMADZU CORPORATION, Kyoto (JP)

(72) Inventors: Koji Numata, Kyoto (JP); Tadanobu Shibabuki, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 18/105,853

(22) Filed: Feb. 5, 2023

(65) Prior Publication Data

US 2023/0249956 A1    Aug. 10, 2023

(30) Foreign Application Priority Data

Feb. 10, 2022  (JP) ................. 2022-019707

(51) Int. Cl.
| | | |
|---|---|---|
| B67B 3/20 | (2006.01) | |
| B67B 7/18 | (2006.01) | |
| B67B 3/28 | (2006.01) | |
| G01N 35/04 | (2006.01) | |

(52) U.S. Cl.
CPC ............ B67B 3/204 (2013.01); B67B 3/2066 (2013.01); B67B 3/2073 (2013.01); B67B 3/28 (2013.01); B67B 7/182 (2013.01); G01N 2035/0405 (2013.01)

(58) Field of Classification Search
CPC ......... B67B 3/20; B67B 3/204; B67B 3/2066; B67B 3/2073; B67B 3/28; B67B 7/182; G01N 2035/0405

USPC ........ 53/75, 317, 331.5, 381.4; 81/3.2, 3.33, 81/3.37, 3.4, 3.42, 3.44
See application file for complete search history.

(56) References Cited

U.S. PATENT DOCUMENTS

| | | | | |
|---|---|---|---|---|
| 105,534 | A * | 7/1870 | Windsor | B25B 1/24 |
| | | | | 81/3.37 |
| 2,732,741 | A * | 1/1956 | Muller-Strobel | B67B 7/164 |
| | | | | 81/3.2 |
| 4,232,499 | A * | 11/1980 | Holstein | B67B 3/2073 |
| | | | | 53/331.5 |
| 5,490,321 | A * | 2/1996 | Kaneko | B67B 7/02 |
| | | | | 29/709 |

(Continued)

FOREIGN PATENT DOCUMENTS

| | | | | | |
|---|---|---|---|---|---|
| CN | 111268614 | A * | 6/2020 | ............... | B67B 7/44 |
| ES | 2265734 | A1 * | 2/2007 | ............... | B67B 7/02 |

(Continued)

*Primary Examiner* — Stephen F. Gerrity
(74) *Attorney, Agent, or Firm* — Renner, Otto, Boisselle & Sklar, LLP

(57) ABSTRACT

A cap attachment-detachment device includes an operation portion that moves in an up-and-down direction, and grips and rotates a cap so as to attach the cap to or attach the cap from a container. The operation portion includes a first grip claw, a second grip claw and the pressing member. The first grip claw and the second grip claw are provided to be opposite to each other and configured to be capable of applying an obliquely upward force inwardly to an upper portion of a side surface of the cap. The pressing member is configured to be capable of coming into contact with an upper surface of the cap.

10 Claims, 11 Drawing Sheets

(56) References Cited

U.S. PATENT DOCUMENTS

| | | | | |
|---|---|---|---|---|
| 5,533,407 A | * | 7/1996 | Besnier | B67B 7/182 |
| | | | | 73/864.31 |
| 2003/0061911 A1 | * | 4/2003 | Niwayama et al. | B67B 7/182 |
| | | | | 81/3.2 |
| 2018/0354765 A1 | * | 12/2018 | Schoenfelder | B67B 3/2066 |

FOREIGN PATENT DOCUMENTS

| | | | | | |
|---|---|---|---|---|---|
| JP | 03-226484 A | | 10/1991 | | |
| JP | H05228379 A | * | 9/1993 | ..... | G01N 2035/0405 |
| JP | H11227885 A | * | 8/1999 | | |

\* cited by examiner

20
CAP ATTACHMENT-DETACHMENT DEVICE AND PRE-PROCESSING DEVICE

BACKGROUND

Technical Field

The present invention relates to a cap attachment-detachment device and a pre-processing device.

Description of Related Art

Pre-processing may be performed on a sample with use of a container such as a centrifuge tube before the sample is analyzed in an analysis device. For example, in pre-processing, a sample to be analyzed and an additive are injected into a container having a cap, and then the content of the container is stirred, etc. Thereafter, the content is extracted from the container and injected into a predetermined vial. The content including the pre-processed sample is supplied from the vial to the analysis device, so that a desired analysis is performed in regard to the sample.

In the pre-processing, before and after the content is injected into the container, or before and after the content is extracted from the container, the cap is attached or detached by a cap attachment-detachment device. For example, in a cap opening-closing device described in JP 3-226484 A, a sample container is gripped by a pair of grippers of a grip opening-closing driver, and a cap is gripped by a robot hand. In this state, the grip opening-closing driver is rotated, so that the cap is attached or detached.

SUMMARY

Since a top plate is formed on an upper portion of the cap, the strength of the upper portion of the cap is relatively high while the strength of a lower portion of the cap is relatively low. Therefore, in the cap opening-closing device described in JP 3-226484 A, when the robot hand grips the lower portion of the cap, the lower portion of the cap may be deformed into an oval shape. Even in a case in which the robot hand grips the upper portion of the cap, depending on the direction in which a force is exerted on the cap from the robot hand, the cap may slip or tilt when being gripped. In these cases, the cap cannot be attached or detached appropriately.

An object of the present invention is to provide a cap attachment-detachment device and a pre-processing device capable of attaching or detaching a cap appropriately.

One aspect of the present invention relates to a cap attachment-detachment device including an operation portion that moves in an up-and-down direction, and grips and rotates a cap so as to attach the cap to or detach the cap from a container, wherein the operation portion includes a first grip claw and a second grip claw provided to be opposite to each other and configured to be capable of applying an obliquely upward force inwardly to an upper portion of a side surface of the cap, and a pressing member configured to be capable of coming into contact with an upper surface of the cap.

Another aspect of the present invention relates to a pre-processing device including the above-mentioned cap attachment-detachment device that attaches a cap to or detached the cap from a container, and a pre-processor that performs pre-processing on a sample contained in the container.

With the present invention, the cap can be attached or detached appropriately.

Other features, elements, characteristics, and advantages of the present disclosure will become more apparent from the following description of preferred embodiments of the present disclosure with reference to the attached drawings.

DETAILED DESCRIPTION (1) Configuration of Cap Attachment-Detachment Device

Figure 1:
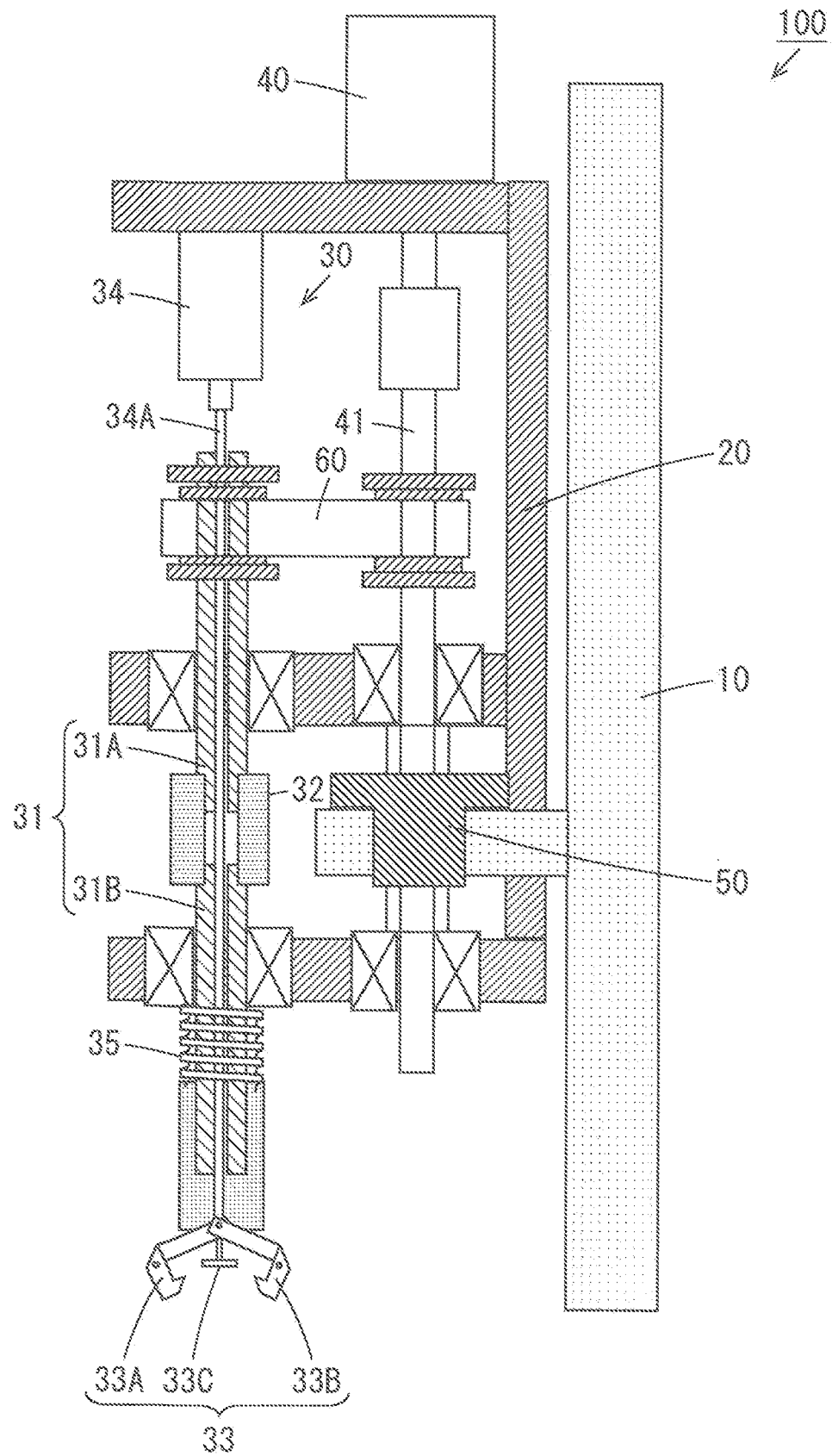
FIG. 1 is a schematic diagram showing the configuration of a cap attachment-detachment device according to one embodiment of the present invention.

A cap attachment-detachment device and a pre-processing device according to embodiments of the present invention will be described below in detail with reference to the drawings. FIG. 1 is a schematic diagram showing the configuration of a cap attachment-detachment device according to one embodiment of the present invention. As shown in FIG. 1, the cap attachment-detachment device 100 includes a base portion 10, a holder 20, an attachment-detachment portion 30, a rotation driver 40, a mover 50 and a transmitter 60. The base portion 10 is attached to an installation surface of the cap attachment-detachment device 100 in the pre-processing device. The holder 20 holds the attachment-detachment portion 30 with the axis of the attachment-detachment portion 30 extending in an up-and-down direction.

The attachment-detachment portion 30 includes a driven portion 31, a restricting portion 32, an operation portion 33, an opening-closing portion 34 and a buffer portion 35. The driven portion 31 includes driven members 31A, 31B having axes that extend in the up-and-down direction and are rotatable about the axes. The driven member 31B is arranged below the driven member 31A.

The restricting portion 32 connects the driven member 31A and the driven member 31B to each other such that a torque generated when the driven member 31A is rotated is transmittable to the driven member 31B. The restricting portion 32 includes a one-way friction clutch, for example, and restricts a torque to be transmitted to the driven member 31B to a value equal to or smaller than a prescribed value when the driven member 31A is rotated in a forward direction (clockwise direction, for example). The prescribed value of torque is adjustable. On the other hand, the restricting portion 32 does not restrict a torque to be transmitted to the driven member 31B when the driven member 31A is rotated in an opposite direction (counterclockwise direction, for example).

Figure 2:
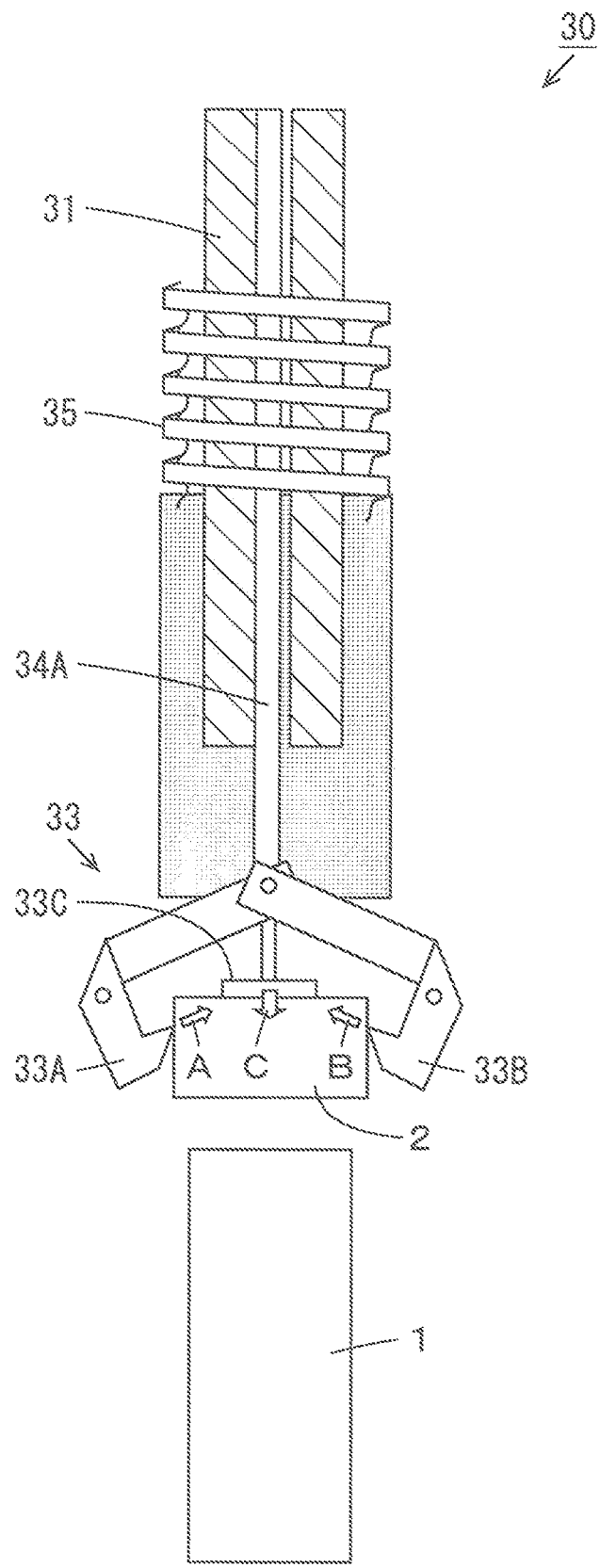
FIG. 2 is an enlarged view showing the configuration of an operation portion of FIG. 1.
Figure 3:
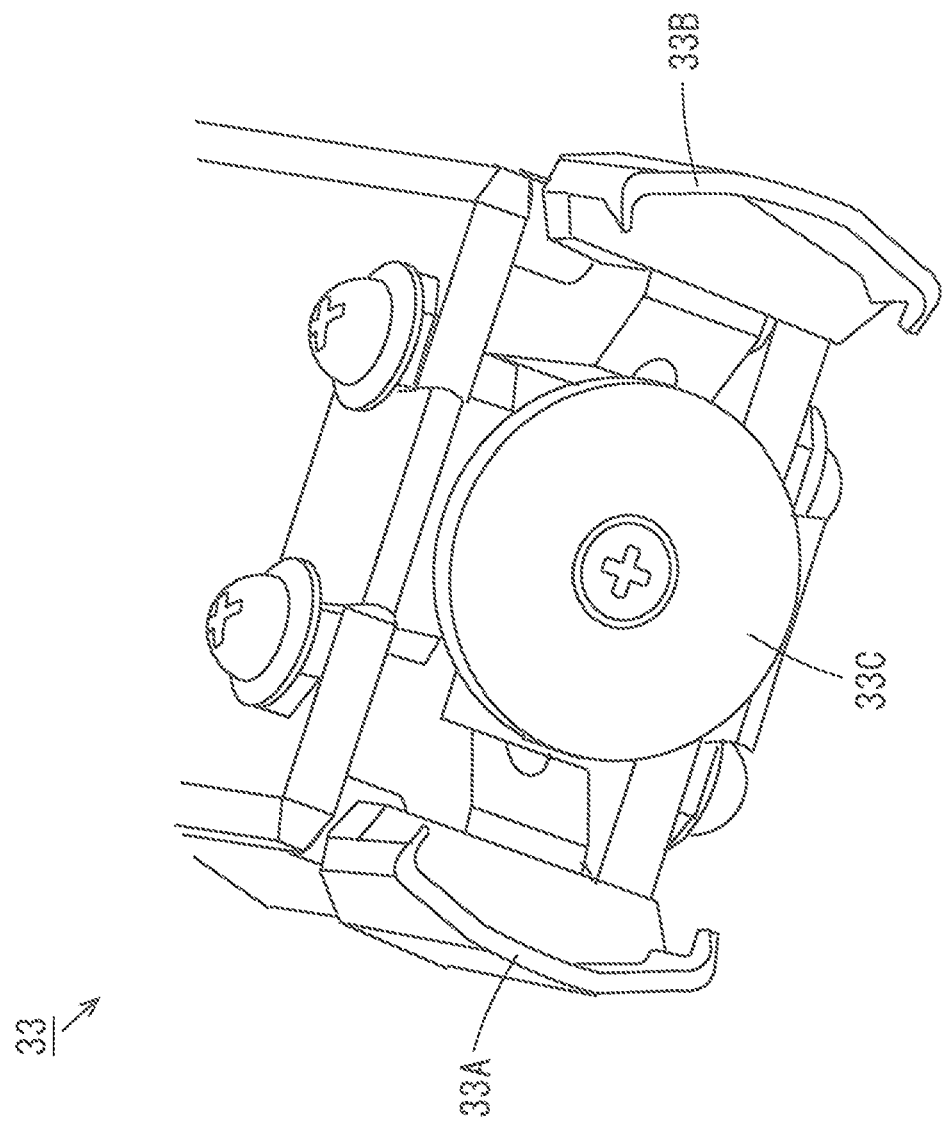
FIG. 3 is a perspective view showing the appearance of the operation portion.

The operation portion 33 is configured to be capable of attaching a cap to or detaching a cap from the upper end of a container by operating the cap from above. In the present example, the container is a centrifuge tube that is used in pre-processing for a sample analysis, for example. The cap is a screw cap that can be screwed onto the upper end of the container. FIG. 2 is an enlarged view showing the configuration of the operation portion 33 of FIG. 1. FIG. 3 is a perspective view showing the appearance of the operation portion 33.

As shown in FIG. 2, the operation portion 33 has a pair of grip claws 33A, 33B that is openable and closable and a pressing member 33C. The grip claws 33A, 33B are connected to the lower end of a drive shaft 34A of the opening-closing portion 34, described below. As shown in FIG. 3, the pressing member 33C has a disc shape and is connected to the lower end of the drive shaft 34A, between the grip claws 33A, 33B, so as to be rotatable with respect to the drive shaft 34A of FIG. 2.

The grip claws 33A, 33B are closed with the cap 2 located between the grip claws 33A, 33B, so that the cap 2 is gripped. At this time, as indicated by the arrow A in FIG. 2, an obliquely upward force is applied inwardly from the tip of the grip claw 33A to an upper portion of the side surface of the cap 2. Similarly, as indicated by the arrow B in FIG. 2, an obliquely upward force is applied inwardly from the tip of the grip claw 33B to an upper portion of the side surface of the cap 2. In this case, an upward force is generated in the cap 2.

With this configuration, as indicated by the arrow C in FIG. 2, the pressing member 33C presses the upper surface of the cap 2 downwardly against the upward force applied to the cap 2. Thus, the cap 2 is not deformed, does not slip or does not tilt, and the operating portion 33 can hold the cap 2 horizontally in a stable state. In this state, the operation portion 33 is rotated, so that the cap 2 is attached to or detached from the container 1.

As shown in FIG. 1, the opening-closing portion 34 includes an air cylinder, for example, and has the drive shaft 34A. The opening-closing portion 34 is fixed to an upper portion of the holder 20, for example. The lower end portion of the drive shaft 34A is connected to the grip claws 33A, 33B and the pressing member 33C while being inserted through the center of the driven portion 31. The opening-closing portion 34 drives the drive shaft 34A to open or close the grip claws 33A, 33B of the operation portion 33. The opening-closing portion 34 may include another actuator such as a solenoid.

The buffer portion 35 includes a spring member, for example, and holds the operation portion 33 at a lower portion of the driven member 31B such that the operation portion 33 is movable in the up-and-down direction with respect to the driven portion 31 and a torque generated when the driven member 31B is rotated is transmittable to the operation portion 33. With this configuration, in a case in which an upward pressing force equal to or larger than a predetermined value is applied from the cap 2 to a lower portion of the operation portion 33, the pressing force in the operation portion 33 is absorbed by upward movement of the operation portion 33.

The rotation driver 40 includes a single actuator such as an electric motor and has a rotation shaft 41. The rotation driver 40 is fixed to an upper portion of the holder 20, for example. The mover 50 includes a linear-motion ball screw member, for example, and is connected to the base portion 10 and the holder 20. The pitch of the linear-motion ball screw member is the same as the pitch of the cap 2. The rotation shaft 41 of the rotation driver 40 is attached to the mover 50. In response to rotation of the rotation driver 40, the mover 50 moves the holder 20 in the up-and-down direction with respect to the base portion 10.

The transmitter 60 is a belt member, for example, and is looped around the driven member 31A of the driven portion 31 of the attachment-detachment portion 30 and the rotation shaft 41 of the rotation driver 40. Thus, the rotation of the rotation driver 40 is transmitted to the driven member 31A. The operation of the cap attachment-detachment device 100 will be described below.

(2) Operation of Cap Attachment-Detachment Device

Figure 4:
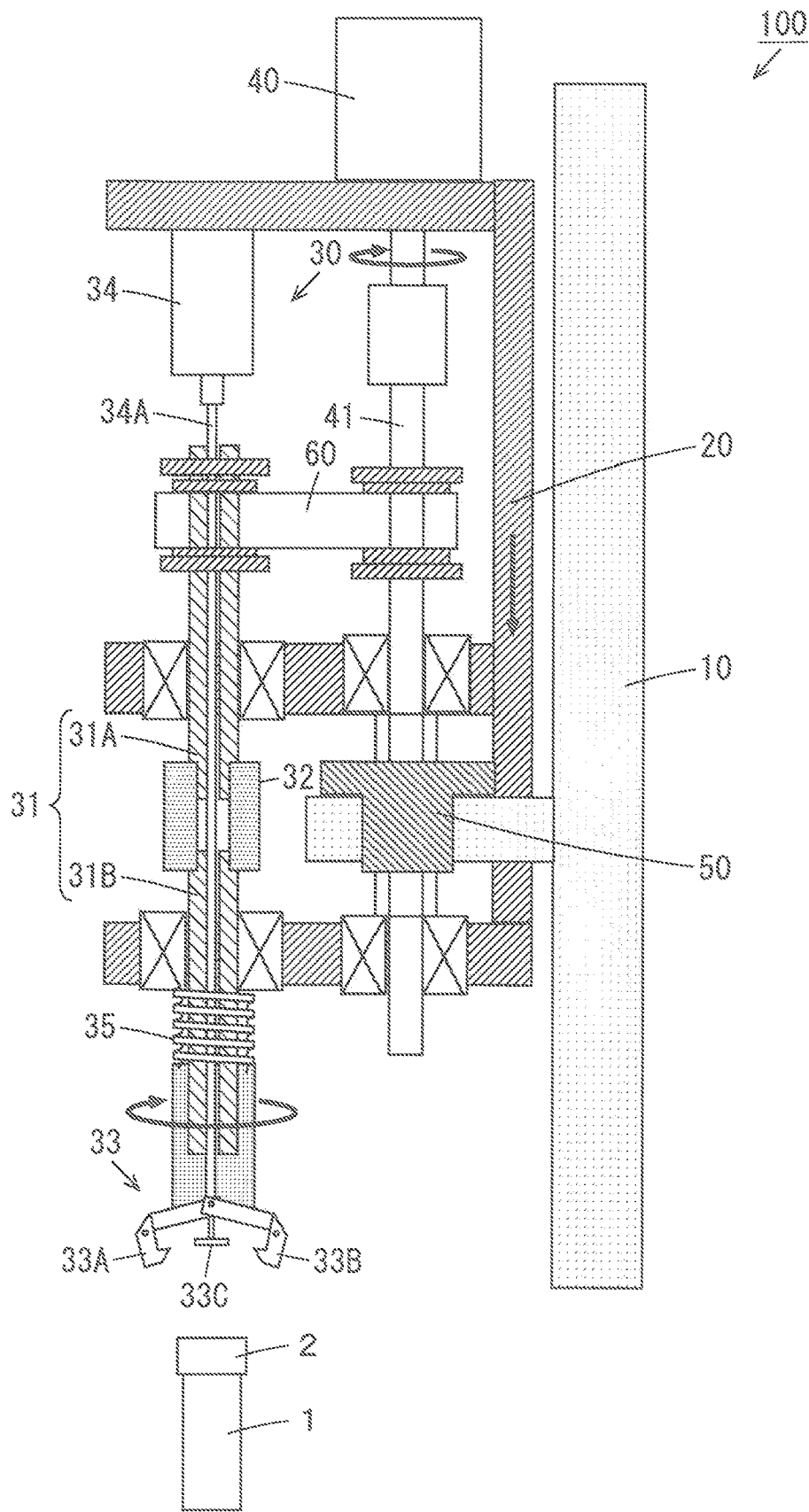
FIG. 4 is a diagram for explaining the operation of the cap attachment-detachment device when a cap is detached.
Figure 5:
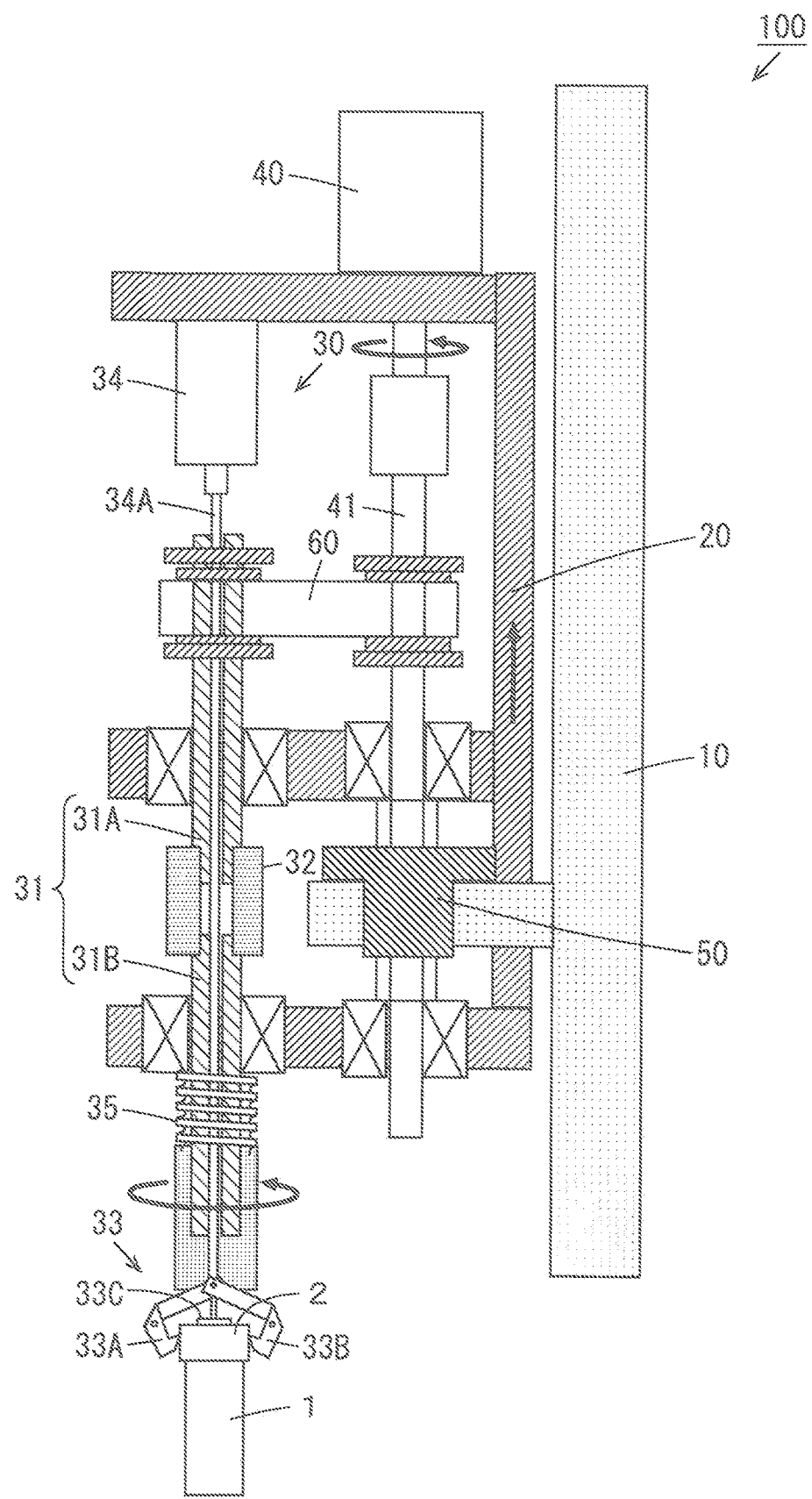
FIG. 5 is a diagram for explaining the operation of the cap attachment-detachment device when the cap is detached.
Figure 6:
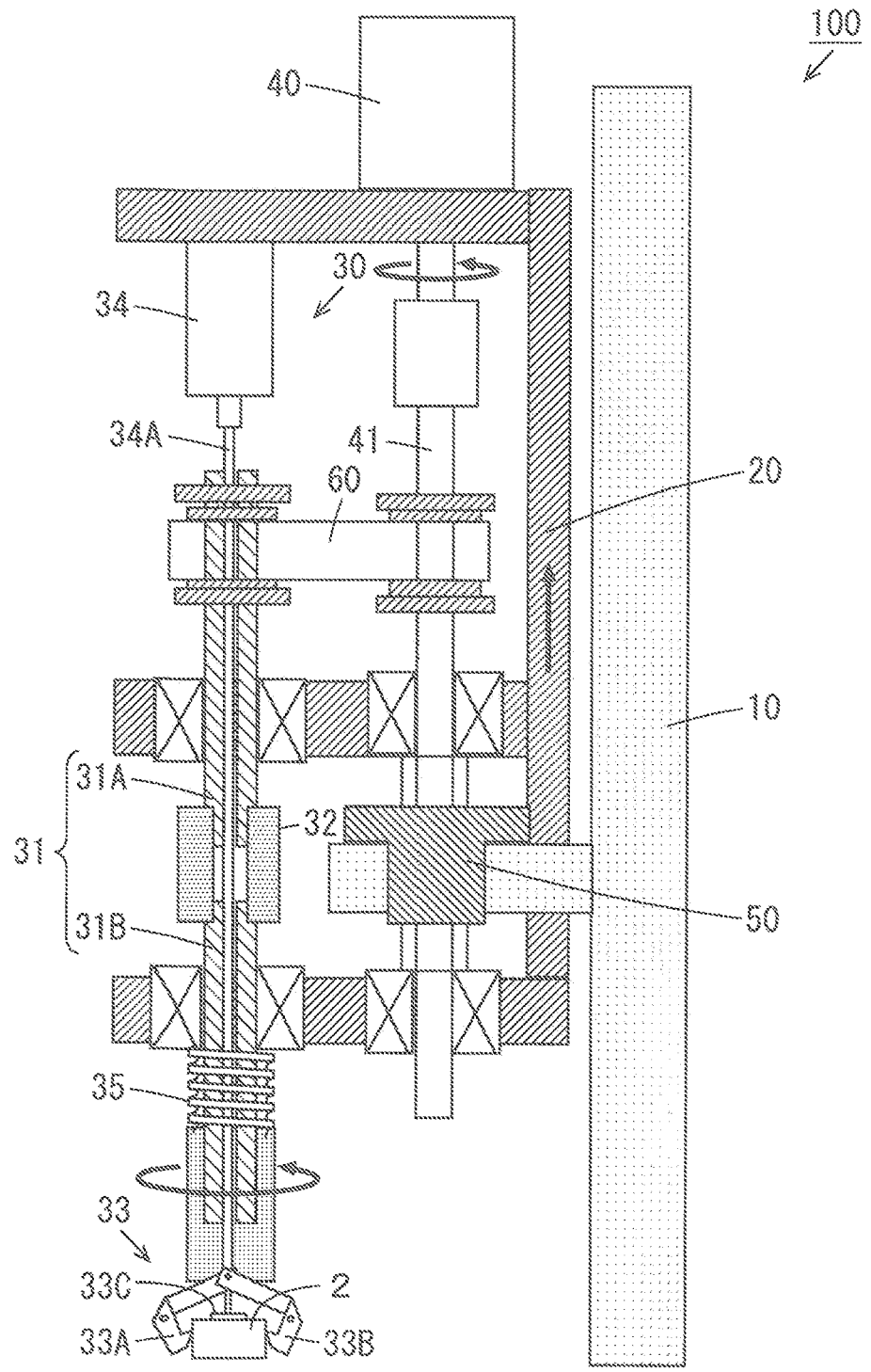
FIG. 6 is a diagram for explaining the operation of the cap attachment-detachment device when the cap is detached.

FIGS. 4 to 6 are diagrams for explaining the operation of the cap attachment-detachment device 100 when the cap 2 is detached. As shown in FIG. 4, when the cap 2 is detached, the operation portion 33 of the attachment-detachment portion 30 is located above the container 1 without gripping the cap 2 and with the grip claws 33A, 33B opened. In this state, the rotation driver 40 is rotated in the forward direction. In this case, the holder 20 is moved downwardly with respect to the base portion 10 by the mover 50. Further, the rotation of the rotation driver 40 is transmitted to the attachment-detachment portion 30 by the transmitter 60. Therefore, the operation portion 33 of the attachment-detachment portion 30 is moved downwardly together with the movement of the holder while being rotated.

Thereafter, as shown in FIG. 5, the pressing member 33C of the operation portion 33 comes into contact with the upper surface of the cap 2. In this case, the rotation of the pressing member 33C is stopped. Therefore, because the upper surface of the cap 2 is not rubbed by the pressing member 33C, the upper surface of the cap 2 is prevented from being damaged. On the other hand, the grip claws 33A, 33B of the attachment-detachment portion 30 continue to be rotated. When the attachment-detachment portion is moved downwardly by a predetermined distance, the movement of the attachment-detachment portion 30 is stopped. At this time, the upper portion of the cap 2 is located between the grip claws 33A, 33B.

Here, the grip claws 33A, 33B are closed. Thus, an upward force is generated in the cap 2 by the grip claws 33A, 33B, and the upper surface of the cap 2 is pressed downwardly by the pressing member 33C. In this case, because the pressing member 33C has a disc shape, the contact area between the pressing member 33C and the upper surface of the cap 2 is relatively large. Therefore, the pressing force applied from the pressing member 33C to the upper surface of the cap 2 is relatively small. Thus, the upper surface of the cap 2 is prevented from being damaged.

The upper surface of the cap 2 is pressed by the pressing member 33C, so that the cap 2 is horizontally gripped in a stable state by the grip claws 33A, 33B. In this state, the rotation driver 40 is rotated in the opposite direction. At this time, a torque applied to the cap 2 by the operation portion 33 is not restricted. Therefore, the cap 2 is efficiently loosened from the container 1. Further, the holder 20 is moved upwardly with respect to the base portion 10 by the mover 50. Thus, the cap 2 is detached from the container 1.

After the cap 2 is detached from the container 1, the rotation of the operation portion 33 in the opposite direction is continued as shown in FIG. 6. In this case, with the operation portion 33 gripping the cap 2, the holder 20 is moved upwardly with respect to the base portion 10 by the mover 50. Thus, the operation of detaching the cap 2 ends.

Figure 7:
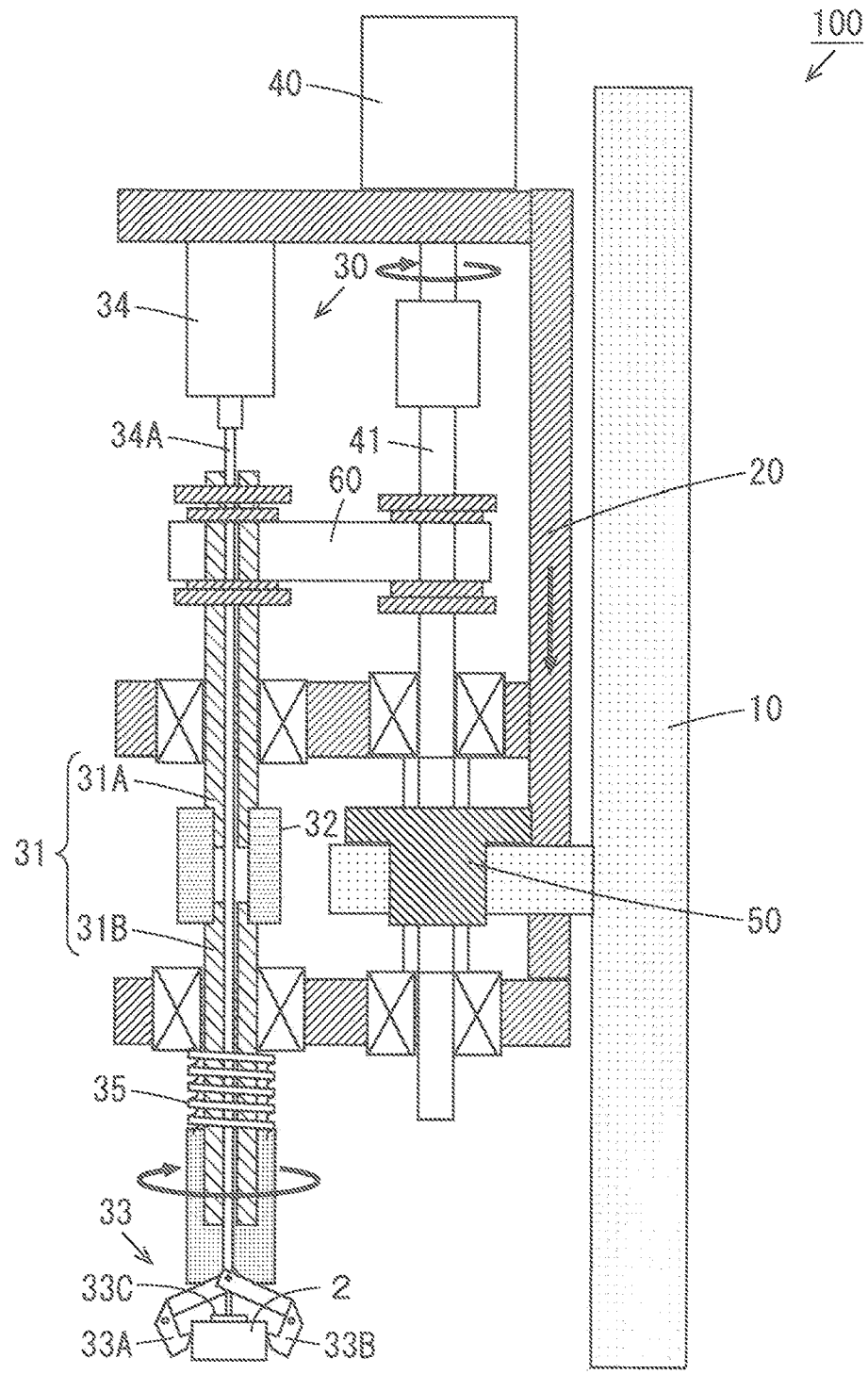
FIG. 7 is a diagram for explaining the operation of the cap attachment-detachment device when the cap is attached.
Figure 8:
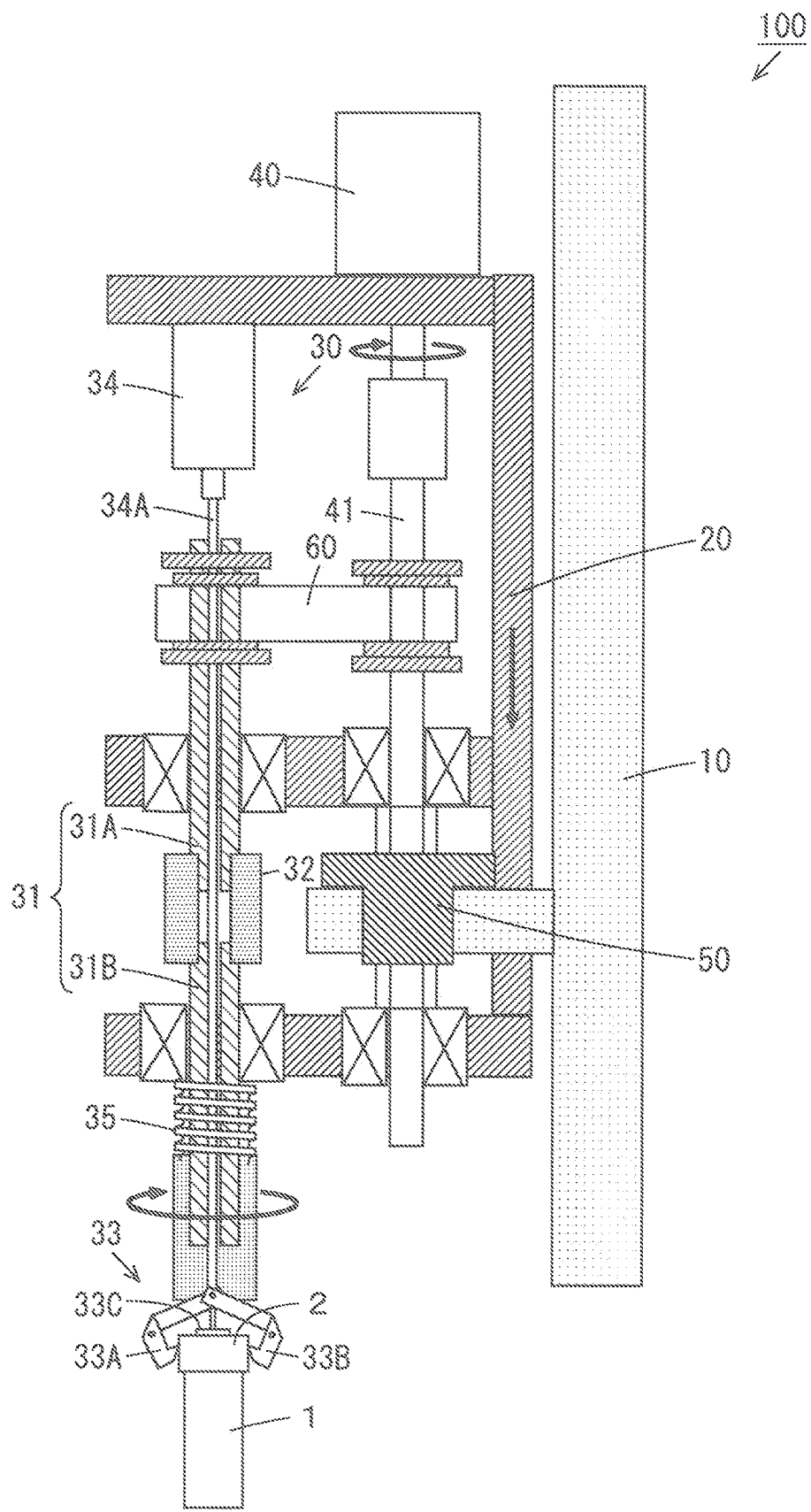
FIG. 8 is a diagram for explaining the operation of the cap attachment-detachment device when the cap is attached.
Figure 9:
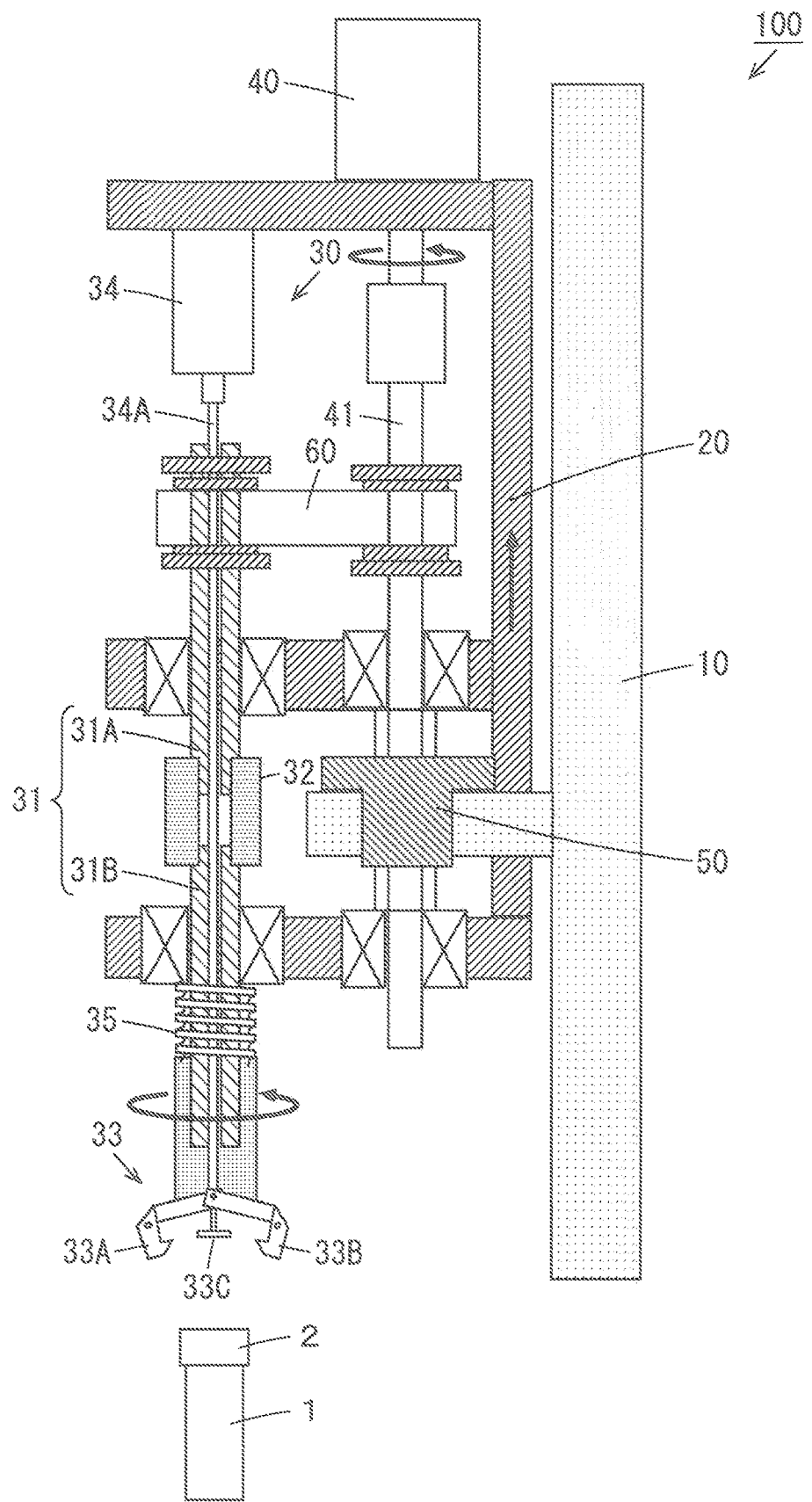
FIG. 9 is a diagram for explaining the operation of the cap attachment-detachment device when the cap is attached.

FIGS. 7 to 9 are diagrams for explaining the operation of the cap attachment-detachment device 100 when the cap 2 is attached. As shown in FIG. 7, when the cap 2 is attached, the operating portion 33 of the attachment-detachment portion 30 is located above the container 1 while stably gripping the cap 2 by closing the grip claws 33A, 33B and bringing the pressing member 33C into contact with the upper surface of the cap 2.

In this state, the rotation driver 40 is rotated in the forward direction, so that the operation portion 33 of the attachment-detachment portion 30 is moved downwardly together with the movement of the holder 20 while being rotated. Thereafter, as shown in FIG. 8, the rotation of the operation portion 33 in the forward direction is continued with the cap 2 gripped by the operation portion 33 abutting against the upper end of the container 1. In this case, the cap 2 is fastened to the container 1. Thus, the cap 2 is attached to the container 1 at the same time.

Here, the operation portion 33 is held by the buffer portion 35 so as to be movable in the up-and-down direction with respect to the driven portion 31. Therefore, in a case in which an upward pressing force that is equal to or larger than a predetermined value is applied to a lower portion of the operation portion 33 due to abutment of the cap 2 against the container 1, the pressing force in the operation portion 33 is absorbed by upward movement of the operation portion 33. Further, when a torque generated when the driven member 31A is rotated in the forward direction reaches a prescribed value, the driven member 31B idles due to the restricting portion 32. Thus, the cap 2 can be fastened uniformly.

After the cap 2 is attached to the container 1, the grip claws 33A, 33B of the operation portion 33 are opened as shown in FIG. 9. Thus, gripping of the cap 2 by the operation portion 33 is released. Thereafter, the rotation driver 40 is rotated in the opposite direction. In this case, with the operation portion 33 not gripping the cap 2, the holder 20 is moved upwardly with respect to the base portion 10 by the mover 50. Thus, the operation of attaching the cap 2 ends.

(3) Pre-Processing Device

Figure 10:
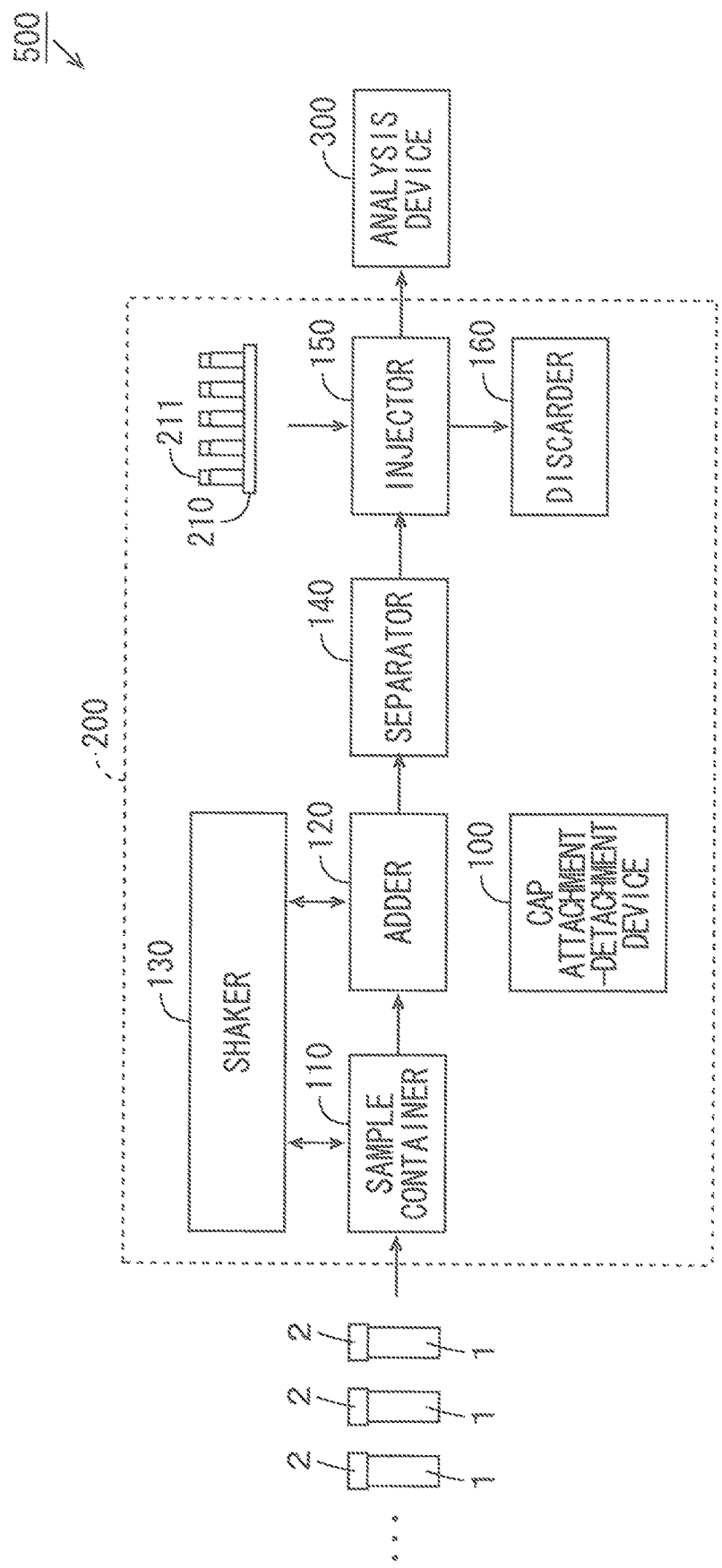
FIG. 10 is a block diagram showing one example of an analysis system including a pre-processing device.

FIG. 10 is a block diagram showing one example of an analysis system including a pre-processing device. As shown in FIG. 10, the analysis system 500 includes the pre-processing device 200 and an analysis device 300. The pre-processing device 200 includes a sample container 110, an adder 120, a shaker 130, a separator 140, an injector 150 and a discarder 160 in addition to the cap attachment-detachment device 100 of FIG. 1. The cap attachment-detachment device 100 is provided in each of the sample container 110, the adder 120 and the injector 150.

A plurality of containers 1 are sequentially introduced into the sample container 110. After detaching a cap 2 from an introduced container 1, the sample container 110 places a sample to be analyzed in the container 1 and attaches the cap 2 to the container 1. The sample to be analyzed includes food, for example. Thereafter, the sample container 110 carries out the container 1 into the shaker 130 and carries out the carried container 1 from the shaker 130 into the adder 120.

After detaching the cap 2 from the container 1 that has been carried in from the sample container 110, the adder 120 adds a predetermined solvent, an internal standard reagent, etc. to the container 1 and attaches the cap 2 to the container 1. Thereafter, the adder 120 carries out the container 1 into the shaker 130 and carries out the carried container 1 from the shaker 130 into the separator 140.

After stirring the content of the container 1 by shaking the container 1 that has been carried in from the sample container 110, the shaker 130 carries out the container 1 into the sample container 110. Further, after stirring the content of the container 1 by shaking the container 1 that has been carried in from the adder 120, the shaker 130 carries out the container 1 into the adder 120.

The separator 140 separates the content of the container 1 into components by applying a centrifugal force to the container 1 that has been carried in from the adder 120. Thereafter, the separator 140 carries out the container 1 into the injector 150. The adder 120, the shaker 130 or the separator 140 is an example of a pre-processor that performs pre-processing on a sample contained in the container 1.

A vial rack 210 holding a plurality of vials 211 for an analysis is introduced into the injector 150. After detaching the cap 2 from the container 1 that has been carried in from the separator 140, the injector 150 extracts part of the content from the container 1 and injects the extracted content into each vial 211 of the vial rack 210. Thus, the content including a pre-processed sample is contained in each vial 211.

Thereafter, the injector 150 attaches the cap 2 to the container 1 and carries out the container 1 into the discarder 160. Further, the injector 150 carries out the vial rack 210 into the analysis device 300. The discarder 160 discards the content of the container 1 that has been carried in from the injector 150.

The analysis device 300 performs a predetermined analysis in regard to the content of each vial 211 of the vial rack 210 that has been carried in from the pre-processing device 200. An analysis includes determining quantity of pesticide residue in food, which is a sample, for example. The analysis device 300 may be a liquid chromatograph mass spectrometer (LC/MS), a gas chromatograph mass spectrometer (GC/MS) or another analysis device, for example.

In each of the sample container 110, the adder 120 and the injector 150 of the pre-processing device 200, it is possible to attach or detach the cap 2 appropriately and efficiently by using the cap attachment-detachment device 100. Thus, throughput can be improved. Further, it can save human labor.

(4) Modified Example

While the pressing member 33C has a disc shape in the above-mentioned embodiment, the embodiment is not limited to this. The pressing member 33C may have a polygonal plate shape such as a triangular plate shape or a quadrangular plate shape. Alternatively, the pressing member 33C may have a bar shape extending in the up-and-down direction, and a plurality of pressing members 33C may be provided.

(5) Effects

In the cap attachment-detachment device 100 according to the present embodiment, an obliquely upward force is applied inwardly to an upper portion of the side surface of the cap 2 by the grip claws 33A, 33B, which are provided so as to be opposite to each other in the operation portion 33. In this case, an upward force is generated in the cap 2. Further, the pressing member 33C of the operation portion 33 comes into contact with the upper surface of the cap 2. Thus, the upper surface of the cap 2 is pressed downwardly by the pressing member 33C against the upward force applied to the cap 2. Therefore, the cap 2 is not deformed, does not slip or does not tilt, and the cap 2 is gripped horizontally in a stable state by the operation portion 33.

With this configuration, the cap 2 can be attached vertically to the container 1. Further, liquid leakage from the container 1 caused by poor attachment of the cap 2 to the container 1 does not occur. Thus, the cap 2 can be appropriately attached or detached.

Further, in the present embodiment, the cap 2 is rotated such that the cap is attached to or detached from the container 1 while the operation portion 33 is moved in the up-and-down direction by the single rotation driver 40. Here, when the pressing member 33C comes into contact with the upper surface of the cap 2, the rotation of the pressing member 33C is stopped. In this case, the upper surface of the cap 2 is not rubbed by the pressing member 33C.

Further, because the pressing member 33C has a disc shape, the contact area between the pressing member 33C and the upper surface of the cap 2 is relatively large. Therefore, a pressing force applied from the pressing member 33C to the upper surface of the cap 2 is relatively small. With these configurations, the upper surface of the cap 2 is not to be damaged. Therefore, even in a case in which being attached to the upper surface of the cap 2, an identifier such as a two-dimensional bar code representing the information about the content of the container 1 is prevented from being damaged to be unreadable.

Further, the rotation driver 40 drives the operation portion 33 such that the operation portion 33 is moved downwardly from a predetermined position by a predetermined distance. In this case, a force can be applied from the grip claws 33A, 33B to an upper portion of the side surface of the cap 2 with a simple configuration without provision of a sensor for detecting the position of the cap 2.

(6) Another Embodiment

Figure 11:
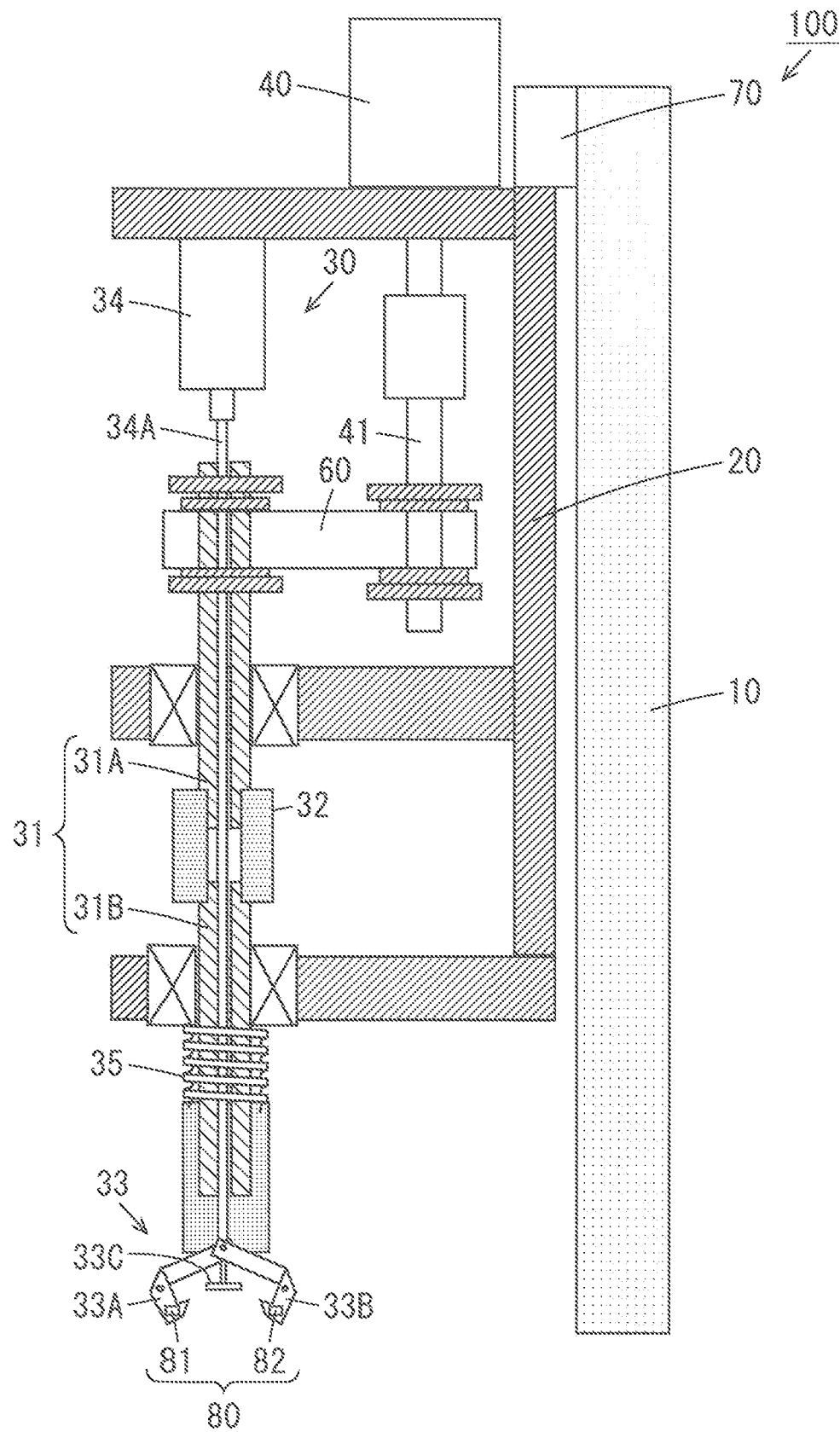
FIG. 11 is a schematic diagram showing the configuration of a cap attachment-detachment device according to another embodiment.

While the rotation driver 40 is provided so as to rotate the attachment-detachment portion 30 while moving the attachment-detachment portion 30 in the up-and-down direction in the above-mentioned embodiment, the embodiment is not limited to this. FIG. 11 is a schematic diagram showing the configuration of a cap attachment-detachment device 100 according to another embodiment. As shown in FIG. 11, the cap attachment-detachment device 100 according to the present embodiment includes a lifting-lowering driver 70 instead of the mover 50.

The lifting-lowering driver 70 is fixed to an upper portion of a base portion 10, for example, while holding a holder 20. The lifting-lowering driver 70 includes an actuator such as an air cylinder or a solenoid and moves the holder 20 in the up-and-down direction with respect to the base portion 10. In this configuration, an attachment-detachment portion 30 can move in the up-and-down direction separately from rotation of the attachment-detachment portion 30.

The cap attachment-detachment device 100 according to the present embodiment may further include a sensor 80 that detects the position of a cap 2. Although being a non-contact sensor including a light emitter 81 and a light receiver 82 in the present example, the sensor 80 may be another type of sensor. The light emitter 81 can emit light. The light receiver 82 can receive light emitted from the light emitter 81. The light emitter 81 and the light receiver 82 may be attached to each of grip claws 33A, 33B.

In this configuration, the attachment-detachment portion 30 is lowered from above the container 1 by the lifting-lowering driver 70 while not gripping the cap 2. Here, in a case in which the cap 2 is not present between the grip claws 33A, 33B, the light receiver 82 receives light emitted from the light emitter 81. On the other hand, in a case in which the cap 2 is present between the grip claws 33A, 33B, the light receiver 82 does not receive light emitted from the light emitter 81. Therefore, even in a case in which the position of the container 1 or the cap 2 is unknown, it is possible to apply a force easily from the grip claws 33A, 33B to an upper portion of the side surface of the cap 2 by closing the grip claws 33A, 33B when the light receiver 82 no longer receives light.

(7) Aspects

It is understood by those skilled in the art that the plurality of above-mentioned illustrative embodiments are specific examples of the below-mentioned aspects.

(Item 1) A cap attachment-detachment device according to one aspect of the present invention may include an operation portion that moves in an up-and-down direction, and grips and rotates a cap so as to attach the cap to or detach the cap from a container, wherein the operation portion may include a first grip claw and a second grip claw provided to be opposite to each other and configured to be capable of applying an obliquely upward force inwardly to an upper portion of a side surface of the cap, and a pressing member configured to be capable of coming into contact with an upper surface of the cap.

In this cap attachment-detachment device, an obliquely upward force is applied inwardly to the upper portion of the side surface of the cap by the first grip claw and the second grip claw that are provided so as to be opposite to each other in the operation portion. In this case, an upward force is generated in the cap. Further, the pressing member of the operation portion comes into contact with the upper surface of the cap. Thus, the upper surface of the cap is pressed downwardly by the pressing member against the upward force applied to the cap. Therefore, the cap is not deformed, does not slip or does not tilt, and the cap is gripped horizontally in a stable state by the operation portion.

With this configuration, it is possible to attach the cap vertically to the container. Further, liquid leakage from the container caused by poor attachment of the cap to the container does not occur. Thus, the cap can be attached or detached appropriately.

(Item 2) The cap attachment-detachment device according to item 1, wherein the pressing member may have a disc shape.

In this case, because the contact area between the pressing member and the upper surface of the cap is relatively large, a pressing force applied from the pressing member to the upper surface of the cap is relatively small. Thus, the upper surface of the cap can be prevented from being damaged.

(Item 3) The cap attachment-detachment device according to item 1 or 2 may further include a rotation driver provided to rotate the operation portion while moving the operation portion in the up-and-down direction.

In this case, with use of the single rotation driver, it is possible to move the operation portion in the up-and-down direction, and rotate the cap so as to attach the cap to or detach the cap from the container.

(Item 4) The cap attachment-detachment device according to item 3, wherein the pressing member may be configured to stop rotation when coming into contact with an upper surface of the cap.

In this case, because not being rubbed by the pressing member, the upper surface of the cap is prevented from being damaged.

(Item 5) The cap attachment-detachment device according to item 3 or 4, wherein the rotation driver may drive the operation portion such that the operation portion moves downwardly by a predetermined distance from a predetermined position.

In this case, a force can be applied from the first grip claw and the second grip claw to the upper portion of the side surface of the cap with a simple configuration without provision of a sensor for detecting the position of the cap.

(Item 6) The cap attachment-detachment device according to any one of items 3 to 5 may further include a mover that moves the operation portion in the up-and-down direction in response to driving of the rotation driver, wherein the cap may include a screw-cap, and the mover may include a linear-motion ball screw member having a same pitch as a pitch of the screw cap.

In this case, with a simple configuration, it is possible to move the operation portion in the up-and-down direction while rotating the operation portion using the single rotation driver such that the screw cap can be attached or detached.

(Item 7) The cap attachment-detachment device according to item 1 or 2 may further include a lifting-lowering driver provided to move the operation portion in the up-and-down direction, a rotation driver provided to rotate the operation portion, and a sensor that detects a position of the cap.

In this case, even in a case in which the position of the container or the cap is unknown, a force can be applied from the first grip claw and the second grip claw to the upper portion of the side surface of the cap.

(Item 8) The cap attachment-detachment device according to any one of items 1 to 7 may further include a buffer portion that absorbs a pressing force applied from the cap to the operation portion when the cap is attached to the container, and a restrictor that restricts a torque applied to the cap by the operation portion to the cap when the cap is attached to the container.

In this case, the cap is attached to the container with a torque restricted by the restrictor while the pressing force applied from the cap to the operating portion is absorbed by the buffer portion. Thus, the cap can be attached to the container while being fastened uniformly.

(Item 9) The cap attachment-detachment device according to item 8, wherein the restrictor does not have to restrict a torque applied to the cap by the operation portion when the cap is detached from the container.

In this case, the cap can be removed from the container efficiently.

(Item 10) A pre-processing device according to another aspect may include the cap attachment-detachment device according to any one of items 1 to 9 that attaches a cap to or detached the cap from a container, and a pre-processor that performs pre-processing on a sample contained in the container.

In this pre-processing device, the cap can be attached or detached appropriately by the above-mentioned cap attachment-detachment device. Thus, throughput can be improved. Further, it can save human labor.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A cap attachment-detachment device comprising an operation portion that moves in an up-and-down direction, and grips and rotates a cap so as to attach the cap to or detach the cap from a container, wherein
    the operation portion includes
    a first grip claw and a second grip claw provided to be opposite to each other and configured to be capable of applying an obliquely upward force inwardly to an upper portion of a side surface of the cap, and
    a pressing member configured to be capable of coming into contact with an upper surface of the cap.

2. The cap attachment-detachment device according to claim 1, wherein
    the pressing member has a disc shape.

3. The cap attachment-detachment device according to claim 1, further comprising a rotation driver provided to rotate the operation portion while moving the operation portion in the up-and-down direction.

4. The cap attachment-detachment device according to claim 3, wherein
    the pressing member is configured to stop rotation when coming into contact with an upper surface of the cap.

5. The cap attachment-detachment device according to claim 3, wherein
    the rotation driver drives the operation portion such that the operation portion moves downwardly by a predetermined distance from a predetermined position.

6. The cap attachment-detachment device according to claim 3, further comprising a mover that moves the operation portion in the up-and-down direction in response to driving of the rotation driver, wherein
    the cap includes a screw-cap, and
    the mover includes a linear-motion ball screw member having a same pitch as a pitch of the screw cap.

7. The cap attachment-detachment device according to claim 1, further comprising:
    a lifting-lowering driver provided to move the operation portion in the up-and-down direction;
    a rotation driver provided to rotate the operation portion; and
    a sensor that detects a position of the cap.

8. The cap attachment-detachment device according to claim 1, further comprising:
    a buffer portion that absorbs a pressing force applied from the cap to the operation portion when the cap is attached to the container; and
    a restrictor that restricts a torque applied to the cap by the operation portion to the cap when the cap is attached to the container.

9. The cap attachment-detachment device according to claim 8, wherein
    the restrictor does not restrict a torque applied to the cap by the operation portion when the cap is detached from the container.

10. A pre-processing device comprising:
    the cap attachment-detachment device according to claim 1 that attaches a cap to or detached the cap from a container; and
    a pre-processor that performs pre-processing on a sample contained in the container.

* * * * *